United States Patent [19] [11] 3,866,829
Egawa et al. [45] Feb. 18, 1975

[54] METHOD AND APPARATUS FOR MEASURING CONCENTRICITY

[75] Inventors: Mitsuru Egawa; Masahiro Akahane; Tomohiro Sanada, all of Tokyo, Japan

[73] Assignee: Tokyo Seimitsu Co., Ltd., Tokyo, Japan

[22] Filed: June 14, 1973

[21] Appl. No.: 369,889

[52] U.S. Cl. ............... 235/151.3, 33/174 Q, 73/462
[51] Int. Cl. .............................................. G06g 7/48
[58] Field of Search ............... 235/151.3, 151.32; 33/174 Q; 73/65, 459, 462, 464

[56] References Cited
UNITED STATES PATENTS

| | | | |
|---|---|---|---|
| 3,248,951 | 5/1966 | Trimble | 73/462 |
| 3,411,074 | 11/1968 | Mayer | 73/462 X |
| 3,426,437 | 2/1969 | Rebhun et al. | 33/174 Q |
| 3,646,601 | 2/1972 | Lash | 73/462 |
| 3,724,279 | 4/1973 | Woolley | 73/462 |
| 3,751,812 | 8/1973 | Meyer | 33/174 Q X |

Primary Examiner—Malcolm A. Morrison
Assistant Examiner—Jerry Smith
Attorney, Agent, or Firm—Paul & Paul

[57] ABSTRACT

A method and apparatus for measuring and recording the concentricity of a cylindrical workpiece relative to a reference axis comprising steps of setting the workpiece on a measuring table, measuring predetermined reference circumferences of the workpiece so as to obtain from the measured values a correction value for correcting the inclination between the rotation axis of the measuring apparatus and the reference axis of the workpiece, subsequently measuring a predetermined circumference of the workpiece to be evaluated, and in accordance with the measured value thus obtained and said correction value, effecting measurement of the concentricity of both axes.

9 Claims, 12 Drawing Figures

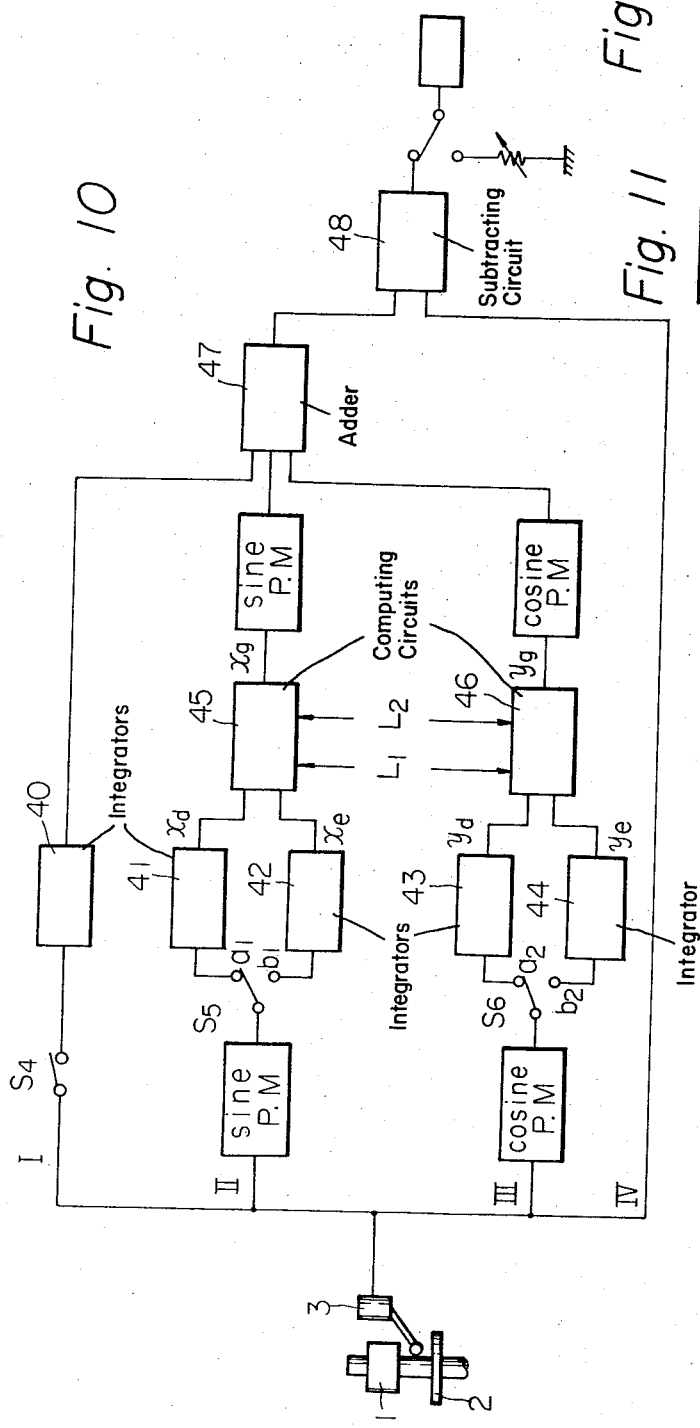
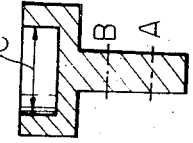
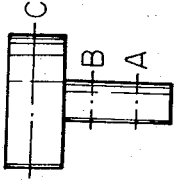

METHOD AND APPARATUS FOR MEASURING CONCENTRICITY

BACKGROUND OF THE INVENTION

The present invention relates to method and apparatus for measuring and recording the concentricity of an object such as a cylindrical workpiece on the basis of a central deviation which is found from the circumference to be evaluated with respect to a reference axis connecting the centers obtained from two reference circumferences of the cylindrical object. In the invention, when the workpiece is mounted vertically on a measuring table of the measuring system, measurement is performed in the condition where the reference axis of the workpiece has a residual inclination against the rotation axis of the measuring system, and said residual inclination is corrected automatically.

In the conventional measurement of concentricity, when setting a cylindrical workpiece on a measuring table, it has been necessary to align the rotation axis of the measuring system exactly with the reference axis of the workpiece. In order to perform this operation, a table for adjusting the inclination angle of the workpiece has been required heretofore to be set on a attaching position adjusting table, and after mounting the workpiece on the inclination adjusting table, this table should be adjusted while measuring the attaching position and the inclination of the workpiece by rotating the measuring system, so as to bring the reference axis of the workpiece into alignment with the rotation axis of the measuring system. This operation is extremely intricate and time consuming, and yet it has been impossible to expect an absolute accuracy.

Another method that has been prevailing heretofore is such that it measures concentricity by setting the workpiece on the measuring table in a manner that the reference axis of the workpiece is in parallel with the rotation axis of the measuring system, and further by correcting the deviation of the reference axis of the workpiece with reference to the rotation axis of the measuring system by means of a computing circuit. However, in this case, for attaining an exact parallelism between the reference axis of the workpiece and the rotation axis, it is necessary to read out the direction and degree of the workpiece eccentricity during rotating the measuring system, and subsequently to correct the eccentricity. Thus, an extremely intricate operation was required.

SUMMARY OF THE INVENTION

A major object of this invention is to provide a method for measuring the concentricity of a workpiece, which is placed approximately in the center of a measuring table, by automatically correcting the residual inclination substantially produced at the mounting of the workpiece and displaying the concentricity when the reference axis of the workpiece is brought into alignment exactly with the rotation axis of a measuring system.

Another object is to provide a concentricity measuring method using an electric means to carry out computation for correcting the residual inclination of the workpiece.

Another object resides in achieving a concentricity measuring system which is capable of displaying on a chart a measurement circle in the form of a least squares circle so that the eccentricity degree of the measurement circle can be read out therefrom.

Another object is to provide a system which is capable of displaying the measured concentricity in a directly readable manner according to the signal associated with said least square circle.

Another object resides in achieving a concentricity measuring system by which, when a circumference to be measured for concentricity can be regarded as a true circle, the corrected profile curve of the circle is recorded on a chart so that the concentricity can be read out therefrom.

A further object relates to a system capable of displaying the concentricity in a directly readable manner according to the signal associated with said profile curve.

BRIEF DESCRIPTION OF THE DRAWINGS

FIG. 10 is a block diagram of another example embodying this invention; and

FIGS. 11 and 12 are a side view and a sectional view of other examples of workpieces.

DESCRIPTION OF THE PREFERRED EMBODIMENTS

Figure 1:
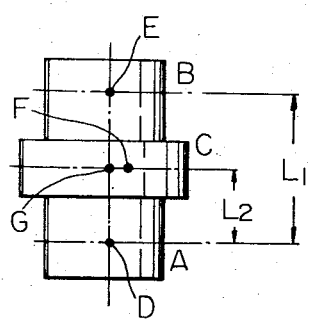
FIG. 1 is a diagram illustrating the principle of concentricity measurement in this invention.

The concentricity measurement in this invention has the following content, of which example will now be described with reference to FIG. 1. In a cylindrical workpiece, the contours of previously specified circumferences A and B $L_1$: length between A and B are measured, and after finding presumed centers D and E from thee signals associated with said contours, these centers are connected by a straight line, which serves as a reference axis. Relating to a reference point G where the reference axis intersects the plane of a predetermined circumference C $L_2$: length between A and C, whose concentricity is to be found and which is perpendicular to the reference axis, and also relating to a center F which is presumed from the signal associated with the contour of circumference C, the concentricity of circumference C is indicated by a length FG which is to be evaluated.

Figure 2:
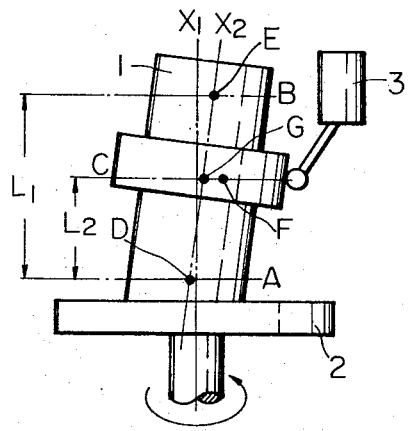
FIG. 2 depicts a measuring system where a workpiece is rotated relative to a detector.

Now the process of concentricity measurement in this invention will be described hereinafter with reference to FIG. 2, which illustrates a workpiece 1 mounted on a rotating table 2 of a measuring system with a certain residual inclination, wherein a detector 3, whose probe is in contact with the circumference of the workpiece, generates an electrical signal associated with the contour of the workpiece. $X_1$ is the rotation axis of table 2, while $X_2$ is the reference axis of workpiece 1. In the present invention, planes perpendicular to $X_1$ are used for circles A, B and C. In the initial setting of the workpiece, it is mounted in such a manner that the inclination of $X_2$ against $X_1$ is minimized, and the residual inclination that still exists is corrected automatically.

Figure 3:
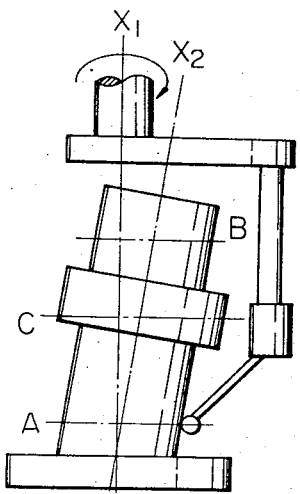
FIG. 3 depicts a measuring system where a detector is rotated relative to a workpiece.

The measuring system shown in FIG. 3 is based on the method of rotating a detector relative to a fixed workpiece, in which $X_1$ designates the rotation axis of the detector. This system has exactly the same effect as the one shown in FIG. 2. The following description will be given referring to the method of FIG. 2 in which the workpiece is rotated relative to the detector.

Figure 4:
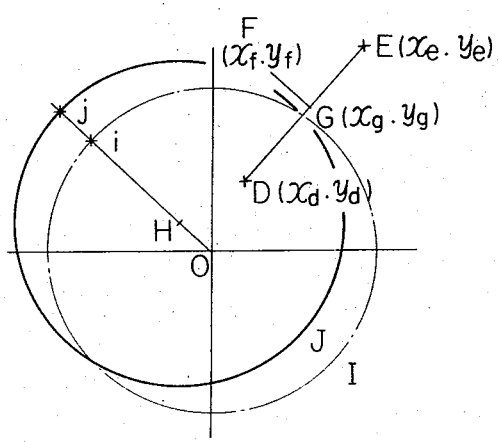
FIG. 4 is a coordinate diagram showing center points projected vertically onto a plane perpendicular to the rotation axis of a measuring system and also showing a corrected least squares circle.

FIG. 4 is a projection chart showing the center points of profiles A, B and C projected onto a plane perpendicular to the rotation axis $X_1$ in the case where the reference axis $X_2$ of the workpiece has a residual inclination relative to the rotation axis $X_1$, and a point O shows the rotation axis $X_1$. In this chart, D and E are the centers of circles A and B, $(x_d, y_d)$ and $(x_e, y_e)$ are their coordinates, G is a reference point where circle C being perpendicular to $X_1$ intersects a line DE (projected line of $X_2$), and $(x_g, y_g)$ is its coordinates. According to the present invention, reference point G is shifted to point O, and point F, in the case where point G is an origin, is found at H. And centering on H, the least squares circle of circle C, or its profile curve I, is drawn. Furthermore, centering on point O, a circle J having the same diameter as that of said least squares circle or profile curve is drawn, and when points $i$ and $j$ are obtained where a straight line OH intersects circles I and J, then the length between $i$ and $j$ indicates the concentricity of circle C. According to this invention, instead of finding $ij$ directly, the difference between the maximum and minimum values of the signal derived from circle I is found first, and then the concentricity is obtained from this difference.

The present invention relates to a method and system for automatically performing the above-described operation, containing an inclination correcting circuit for shifting point G to point O, and point F to point H. In order to shift point G to point O, it is necessary to compute the coordinates $(x_g, y_g)$ from the values of $x_d, y_d, x_e, y_e, L_1$ and $L_2$, which are given in the following relationship.

$$L_1/(x_e - x_d) = L_2/(x_g - x_d)$$
$$x_g = L_2/L_1(x_e - x_d) + x_d \quad (1)$$

$$L_1/(y_e - y_d) = L_2/(y_g - y_d)$$
$$y_g = L_2/L_1(y_e - y_d) + y_d \quad (2)$$

Computation of the above equations (1) and (2) is carried out by the computing circuit which will be described hereinafter. Next, one embodiment of the measuring system will be explained.

Figure 5:
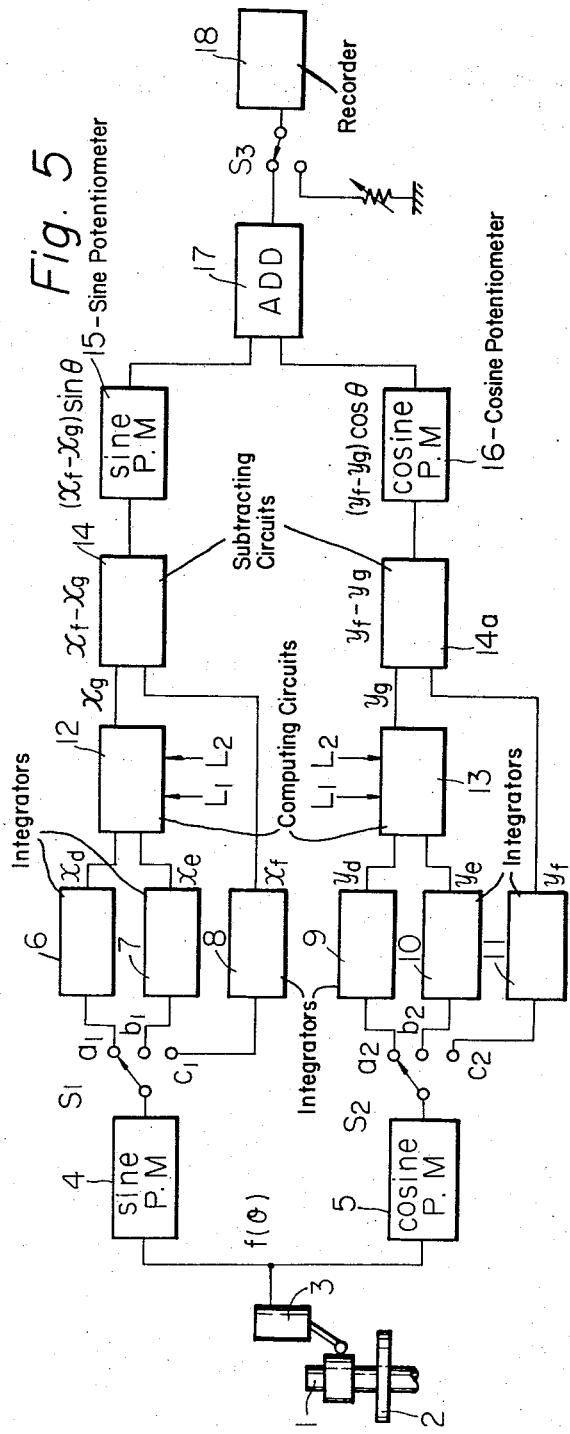
FIG. 5 is a block diagram showing an exemplary embodiment of this invention.

In FIG. 5, a probe of a detector 3 is brought into contact with the circumference of a workpiece 1 set on a table 2 of the measuring system, and said table is rotated. A signal $f(\theta)$ associated with the circumferential contour is applied from detector 3 to first sine and cosine potentiometers 4 and 5 which rotate synchronously with the table, so that $f(\theta) \sin \theta$ and $f(\theta) \cos \theta$ are produced and sent to switches $S_1$ and $S_2$. These switches have three contacts of $a_1, b_1$ and $c_1$, and $a_2, b_2$ and $c_2$ respectively. The potentiometer outputs are applied to $a_1$ and $a_2$ in case of circle A measurement by detector 3, or to $b_1$ and $b_2$ in case of circle B measurement, or to $c_1$ and $c_2$ in case of circle C measurement. And integrators 6, 7, 8, 9, 10 and 11 are connected respectively to said contacts. Accordingly, the outputs of integrators 6 and 9 are expressed as follows:

$$x_d = \frac{1}{\pi} \int_0^{2\pi} f_A(\theta) \sin \theta d\theta$$

$$y_d = \frac{1}{\pi} \int_0^{2\pi} f_A(\theta) \cos \theta d\theta$$

$f_A(\theta)$ is the measured signal value of circle A. Similarly, the outputs of integrators 7, 10, 8 and 11 are:

$$x_e = \frac{1}{\pi} \int_0^{2\pi} f_B(\theta) \sin \theta d\theta$$

$$y_e = \frac{1}{\pi} \int_0^{2\pi} f_B(\theta) \cos \theta d\theta$$

$$x_f = \frac{1}{\pi} \int_0^{2\pi} f_C(\theta) \sin \theta d\theta$$

$$y_f = \frac{1}{\pi} \int_0^{2\pi} f_C(\theta) \cos \theta d\theta$$

Outputs $x_d$ and $x_e$ of integrators 6 and 7 are applied to a computing circuit 12, while outputs $y_d$ and $y_e$ of integrators 9 and 10 are applied to a computing circuit 13. Signals, which are proportional to the distance between $L_1$ and $L_2$ between measurement circles A and B and A and C shown in FIG. 1, are applied to the respective computing circuits, where computation of the equations (1) and (2) is carried out so that coordinate values $x_g$ and $y_g$ of reference point G are obtained. Subsequently, outputs $x_g$ and $y_g$ of computing circuits 12 and 13, and outputs $x_f$ and $y_f$ of integrators 8 and 11, are respectively applied to subtracting circuits 14 and 14a so as to produce $x_f - x_g$ and $y_f - y_g$, which are further applied to a second sine potentiometer 15 and a second cosine potentiometer 16 rotating synchronously with the measuring table, so that $(x_f - x_g) \sin \theta$ and $(y_f - y_g) \cos \theta$ are produced. The outputs thus obtained are then sent to an adder 17 to produce $(x_f - x_g) \sin \theta + (y_f - y_g) \cos \theta$, which is applied to a recorder 18 through a switch $S_3$ so as to be drawn on a chart.

Figure 6:
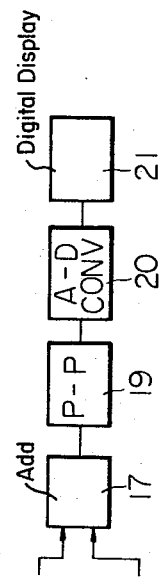
FIG. 6 is a block diagram to be connected to the output of the diagram of FIG. 5, showing a system for providing a digital display of concentricity.

In the above-described circuit configuration, the outputs of subtracting circuits 14 and 14a indicate the coordinates of H in FIG. 4, and the output of an adder 17 corresponds to the least squares circle I of circle C whose center has been shifted to H. Then, switch $S_3$ is turned to the other contact and the recorder 18 is actuated to draw a circle J having the same diameter as that of said least squares circle. By comparison of these two circles I and J, it is possible to find the concentricity and the eccentricity direction of circle C from the traces thus drawn. As shown in FIG. 6, by applying the output of an adder 17 to a peak-to-peak circuit 19 and displaying half of the output signal obtained from said peak-to-peak circuit 19, the concentricity can be rendered directly readable. Moreover, the concentricity can be found further definitely by feeding half of the peak-to-peak value to a digital display device 21 through an A-D converter 20.

Figure 7:
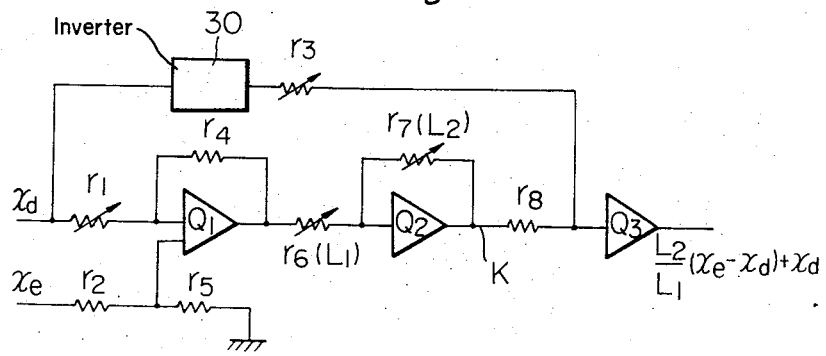
FIGS. 7 through 9 are circuit diagrams showing exemplary embodiments of residual inclination correction computing circuits.

Now, referring to FIG. 7, explanation will be given on an embodiment of an inclination correction computing circuits 12 and 13 which compute the above equations (1) and (2). $Q_1$ is a differential amplifier; $Q_2$ is an inverter; and $Q_3$ is a phase inverter. $Q_1$, $Q_2$ and $Q_3$ are in cascade connection, in which variable resistors $r_1$ and $r_6$, and a resistor $r_8$, are inserted. A resistor $r_4$ is connected in parallel with amplifier $Q_1$, and a variable resistor $r_7$ is connected in parallel with $Q_2$, and input $x_d$ is applied through $r_1$ to a reversal input of differential amplifier $Q_1$. Further, in parallel with said circuit, $x_d$ is inserted between $r_8$ and $Q_3$ through an inverter 30 and a variable resistor $r_3$. Input $x_e$ is applied to a normal input of $Q_1$ through a resistor $r_2$, and a resistor $r_5$ is inserted between the normal input of $Q_1$ and ground. In such a circuit, when $r_6$ and $r_7$ are so set as to be proportional to $L_1$ and $L_2$ respectively, with each resistor being adjusted selectively, then computation of $(x_e-x_d)$ is carried out in amplifier $Q_1$. Since $Q_2$ is a phase-reversal amplifier, $- L_2/L_1(x_e-x_d)$ is obtained at point $k$. In the meanwhile, input $x_d$ is turned into $(-x_d)$ by means of inverter 30 and is subsequently applied to the output of $Q_2$, so that $- L_2/L_1(x_e-x_d) - x_d$ is produced, which is then reversed in phase to produce $L_2/L_1(x_e-x_d) + x_d$, and computation of the equation (1) is carried out. Equation (2) can also be computed by the exactly identical computing circuit.

Figure 8:
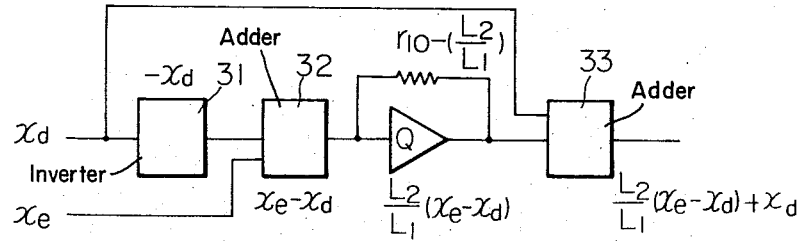

Another exemplary circuit 12 and 13 for carrying out such computation is shown in FIG. 8, in which input $x_d$ is turned into $(-x_d)$ by an inverter 31 and $x_e$ is added thereto by an adder 32, so that $(x_e-x_d)$ is produced. Accordingly, when a resistor $r_{10}$ connected in parallel with Q is set to the value $L_2/L_1$, then $L_2/L_1(x_e-x_d)$ is produced by Q. By adding $x_d$ thereto by means of an adder 33, $L_2/L_1(x_e-x_d) + x_d$ is obtained.

Figure 9:
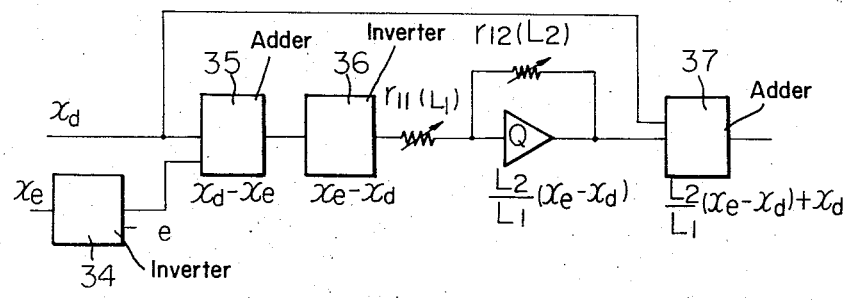

Another example of circuit 12 and 13 is shown in FIG. 9. Input $x_e$ is turned into $(-x_e)$ by an inverter 34 and then is applied to an adder 35, where $(x_d-x_e)$ is produced. This output is further changed to $(x_e-x_d)$ by an inverter 36. By setting resistors $r_{11}$ and $r_{12}$ in proportion to $L_1$ and $L_2$ respectively, $L_2/L_1(x_e-x_d)$ is obtained by Q. Subsequently, $x_d$ is added thereto by means of an adder 37, so that $L_2/L_1(x_e-x_d) + x_d$ is computed. In FIGS. 8 and 9, resistors that are naturally required to form the circuits are not shown in order to simplify explanation.

In the above-described method and system for measuring concentricity, measurement is performed on the basis of the least squares circle of circle C. However, when the shape of circle C can be regarded approximately as a true circle, it is possible to obtain the concentricity from its profile curve. This method is shown in the block diagram of FIG. 10, where signal $f(\theta)$ from a detector is divided so as to be applied to four channels of I, II, III and IV.

Channel I is a circuit for correcting the D.C. component from the detector, in which a switch $S_4$ is closed only when the detector is sending the signal associated with circle C. The signal is applied to an integrator 40 which carries out integration during one rotation of the workpiece, so that an integral of $$\frac{1}{\pi}\int_0^{2\pi} f_c(\theta)d\theta$$

is obtained.

Channels II and III are the same as the one shown in FIG. 5, consisting of integrators 41, 42, 43 and 44 which integrate sine and cosine components of the signals detected from circles A and B, computing circuits 45 and 46 for computing the correction values $x_g$ and $y_g$ in accordance with the integral values $x_d$, $y_d$, $x_e$ and $y_e$, and first and second sine and cosine potentiometers. The outputs of channels I, II and III are applied to an adder 47, where addition is carried out to produce $$g(\theta) = \frac{1}{\pi}\int_0^{2\pi} f_c(\theta)d\theta + x_g \sin\theta + y_g \cos\theta \quad (3)$$

With respect to $f_c(\theta)$ from channel IV, $f_c(\theta) - g(\theta)$ is computed by a subtracting circuit 48, and the output signal thus obtained is recorded on a chart, or is applied to a peak-to-peak measuring circuit. $g(\theta)$ shown in equation (3) denotes that the center F of circle C in FIG. 4 is shifted to H through correction of the inclination, and the error in D.C. component of the detector is eliminated from the profile curve.

Then, the profile curve, where correction of $f_c(\theta)$ from channel IV has been made, is drawn on the chart, and the concentricity is displayed by the peak-to-peak measurement in a directly readable manner.

In the above description, the workpiece illustrated as an example is such that circle C exists between circles A and B. However, workpieces that are applicable to the measurement of this invention are not limited to said example alone. Regarding those shown in FIGS. 11 and 12, for example, the concentricity of circle C can be measured in the similar manner to circles A and B serving as references.

It is to be understood that the present invention is not limited to the above-described embodiments alone, but contains systems and circuits that can be embodied by the methods provided in accordance with the present invention.

What we claim is:

1. In the method of measuring the concentricity of a workpiece, said workpiece being positioned with a reference axis of the workpiece inclined relative to an axis of rotation of a measuring system, where the least squares circles computed from the measured contour of the workpiece is a measurement circle, the improved steps resulting in an ascertainment of the coordinates of a measurement circle comprising:

obtaining first signals representing the central coordinates of two reference circles defined relative to the workpiece;

obtaining second signals representing the distance between the reference circles and the measurement circle;

computing the coordinates of a reference point of the measurement circle where said reference point is the point of intersection of the line connecting the centers of said two reference circles and the plane of said measurement circle, from said first and second signals, thereby ascertaining the coordinates of the center position of the measurement circle.

2. In the improved method for measuring the concentricity of a workpiece as set forth in claim 1, wherein said first signals representing the central coordinates of two reference circles are electrical signals $(x_e, x_d)$ and $(y_e, y_d)$ associated with the central coordinates of said two reference circles of the workpiece, said coordinates being represented by the integral values obtained during one rotation of the workpiece from sine and cosine components of the signals associated with the contours of said two reference circles; wherein the step of ascertaining the coordinates of the center position of the measurement circle is performed by electrical computing means utilizing as inputs said electrical signals and utilizing resistance values determined in proportion to the referenced circles and to the distances, represented by $L_1$ and $L_2$, between the reference circles and the measurement circle, and wherein said corrected coordinates of said center position are represented by $L_2/L_1 (x_e - x_d) + x_d$ and $L_2/L_1 (y_e - y_d) + y_d$.

3. In the improved method for measuring the concentricity of a workpiece as set forth in claim 1, wherein the step of computing the corrected coordinates of a center point of a measurement circle is performed by electrical computing means;

wherein said first signals are first electrical signals;

wherein said first electrical signals indicate the coordinates of the centers of two reference circles;

wherein said coordinates of the centers of two reference circles are expressed by integral values of sine and cosine components of the contours of said two reference circles over one revolution of said workpiece;

and wherein said second electrical signals indicate the distances between said two reference circles and the measurement circle of said workpiece.

4. A system for measuring the concentricity of a workpiece comprising:

detector means which rotates relative to the workpiece for generating signals associated with the contour of the workpiece;

first sine and cosine potentiometer means, which rotate synchronously with said detector means, for producing sine and cosine signal components of the signals generated by said detector means;

integrator means for integrating, over one rotation of the detector at each detecting position, the output signals of said potentiometer means;

x-axis and y-axis correction computing circuit means for computing the coordinates of a reference point, utilizing the output signals of said integrator means for each of two reference circles and also utilizing electrical signals representing the distances between the reference circles and the measurement circle;

second sine and cosine potentiometer means, which rotate synchronously with said detector means, for producing sine and cosine components of the outputs of said x-axis and y-axis correction computing circuit means;

adding circuit means for summing the outputs of said second sine and cosine potentiometer means;

and recorder means for drawing, accordingly to the output of said adding circuit means, the least squares circle of the measurement circle having the center which has been corrected with respect to inclination.

5. A system for measuring the concentricity of a workpiece comprising:

detector means which rotates relative to the workpiece for generating signals associated with the contour of the workpiece;

first sine and cosine potentiometer means, which rotate synchronously with said detector means, for producing said sine and cosine signal components of the signals generated by said detector means;

integrator means for integrating, over one rotation of the detector at each detecting position, the output signals of said potentiometer means;

x-axis and y-axis correcting computing circuit means for computing the coordinates of a reference point utilizing the output signals of said integrator means for each of two reference circles and also utilizing electrical signals representing the distances between the reference circles and the measurement circle;

second sine and cosine potentiometer means, which rotate synchronously with said detector means, for producing sine and cosine components of the output of said x-axis and y-axis correction computing component circuit means;

adding circuit means for summing the output of said second sine and cosine potentiometer means;

peak-to-peak circuit means for producing a difference between the maximum and minimum values of the signal used for drawing, according to the output of said adding circuit means, the least squares circle of the measurement circle having the center that has been corrected with respect to inclination;

and display device means for displaying half of said difference as the concentricity according to the output of said peak-to-peak circuit means.

6. A system for measuring the concentricity of a workpiece comprising:

detector means which rotates relative to the workpiece for generating signals associated with the contour of the workpiece;

first channel means for producing a direct current component correction value by integrating during one rotation of said detector means the detection signal generated by said detector means at the workpiece contour whose circumference is to be measured for concentricity;

second and third channel means, comprising first sine and cosine potentiometer means, which rotate synchronously with said detector means, for producing sine and cosine components of the signal from said detector means;

integrator means for integrating the outputs of said potentiometer means over one rotation of the detector means at each reference circle detecting position;

x-axis and y-axis correction computing circuit means for computing the coordinates of a referenced point utilizing the output signals of said integrator means for each of two reference circles and utilizing electrical signals representing the distances between the reference circles and the measurement circle;

second sine and cosine potentiometer means, which rotate synchronously with said detector means, for producing sine and cosine components of the outputs of said x-axis and y-axis correction computing circuit means;

adding circuit means for summing the outputs of said first channel means, said second sine potentiometer means and said second cosine potentiometer means;

subtracting circuit means for subtracting the adding circuit means output from the detector means output;

and recorder means for drawing, according to the output of said subtracting circuit means, a profile curve having the corrected center of the measurement circle.

7. A system for measuring the concentricity of a workpiece comprising:

detector means which rotates relative to the workpiece for generating signals associated with the contour of the workpiece;

first channel means for producing a direct current component correction value by integrating during one rotation of said detector means the detection signal of the circumference to be measured for concentricity;

second and third channel means comprising first sine and cosine potentiometer means, which rotate synchronously with said detector means, for producing sine and cosine components of the signal from said detector means;

integrator means for integrating the outputs of said potentiometer means over one rotation of the detector means at each reference circle detecting position;

x-axis and y-axis correction computing circuit means for computing the coordinates of a reference point utilizing the output signals of said integrator means for each of two reference circles and utilizing electrical signals representing the distances between the reference circles and the measurement circle;

second sine and cosine potentiometer means which rotate synchronously with said detector means, for producing sine and cosine components of the outputs of said x-axis and y-axis correction computing circuit means;

adding circuit means for summing the outputs of said first channel means, said second sine potentiometer means and said second cosine potentiometer means;

subtracting circuit means for subtracting the adding circuit means output from the detector means output;

peak-to-peak circuit means for producing a difference between the maximum and minimum values of the signal used for drawing, according to the output of said subtracting circuit means, a profile curve having the corrected center of the measurement circle; and a display means for displaying half of said difference as the concentricity according to the output of said peak-to-peak circuit means.

8. A method for measuring the concentricity of a workpiece, about an axis of rotation of the workpiece, comprising the steps of:

a. establishing a three axis orthogonal reference coordinate measurement system wherein one of the three axes is designated as the axis of rotation of the workpiece;

b. positioning the workpiece within the three axis orthogonal reference coordinate system with the axis of rotation of the workpiece coincidental with said designated one of the three axes of the orthogonal reference coordinate system;

c. establishing first and second reference circles, said circles being oriented with their centers coincident with the axis of rotation of the workpiece and being oriented such that the planes of said circles are orthogonal to the axis of rotation of the workpiece;

d. establishing a reference axis for the workpiece, said reference axis being non-coincidental with any of the three axes of the orthogonal reference coordinate measurement system;

e. measuring the contour of the workpiece as it rotates about its axis of rotation, said contour defining a measurement circle and said contour being measured in a plane perpendicular to the axis of rotation of the workpiece;

f. projecting the two points defined by the intersection of the reference axis with the planes of the reference circles onto the plane defined by the two axes, other than the axis of rotation, of the orthogonal reference coordinate measurement system, to define two planar points;

g. ascertaining a straight line connecting said two planar points, said straight line being the projection of said reference axis on said plane defined by the two axes which are other than the axis of rotation, of the orthogonal reference coordinate system;

h. computing a least square circle from said measurement of the contour of the workpiece, said least squares circle being in a plane perpendicular to the axis of rotation of the workpiece;

i. projecting the point defined by the intersection of said least squares circle and the axis of rotation of the workpiece onto the plane defined by the two axes other than the axis of rotation of the orthogonal reference coordinate system, to define a first circle center point;

j. projecting the center point of the least squares circle onto the plane defined by the two axes other than the axis of rotation of the orthogonal reference coordinate system, to define a second circle center point;

k. transforming the first circle center point in the plane defined by the two axes other than the axis of rotation of the orthogonal reference coordinate system, to the point of intersection of said two axes;

l. transforming the second circle center point in the plane defined by the two axes, other than the axis of rotation, of the orthogonal reference coordinate system to a new, corrected second circle center point position such that the spatial orientation of the second circle center point to the first circle center point remains the same as before the transformation of the two circle center points;

m. constructing two said least squares circles with centers at said first and second circle center points;

n. ascertaining the relationship as would result by drawing a straight line connecting said first and second circle center points and passing through said two least squares circles;

o. and obtaining the concentricity of the workpiece as the ratio of the shortest length of said straight line contained between the two least squares circles, to the diameter of said least square circle.

9. The method of claim 8 wherein steps e through o inclusive are performed by electronic circuit means.

* * * * *

UNITED STATES PATENT OFFICE
CERTIFICATE OF CORRECTION

Patent No. 3,866,829   Dated February 18, 1975

Inventor(s) Mitsuru Egawa, Masahiro Akahane, Tomohiro Sanada

It is certified that error appears in the above-identified patent and that said Letters Patent are hereby corrected as shown below:

Column 2, line 49, before "$L_1$" insert -- ( -- and after "B" (second occurrence) insert -- ) --.

Column 2, lines 55 and 56, before "$L_2$" insert -- ( -- and after "C" insert -- ) --

Signed and sealed this 27th day of May 1975.

(SEAL)
Attest:

RUTH C. MASON
Attesting Officer

C. MARSHALL DANN
Commissioner of Patents
and Trademarks